July 26, 1932.  W. VERNET  1,868,932
METHOD AND APPARATUS FOR FORMING RECEPTACLES FROM SPONGE RUBBER
Filed Jan. 31, 1928   4 Sheets-Sheet 1
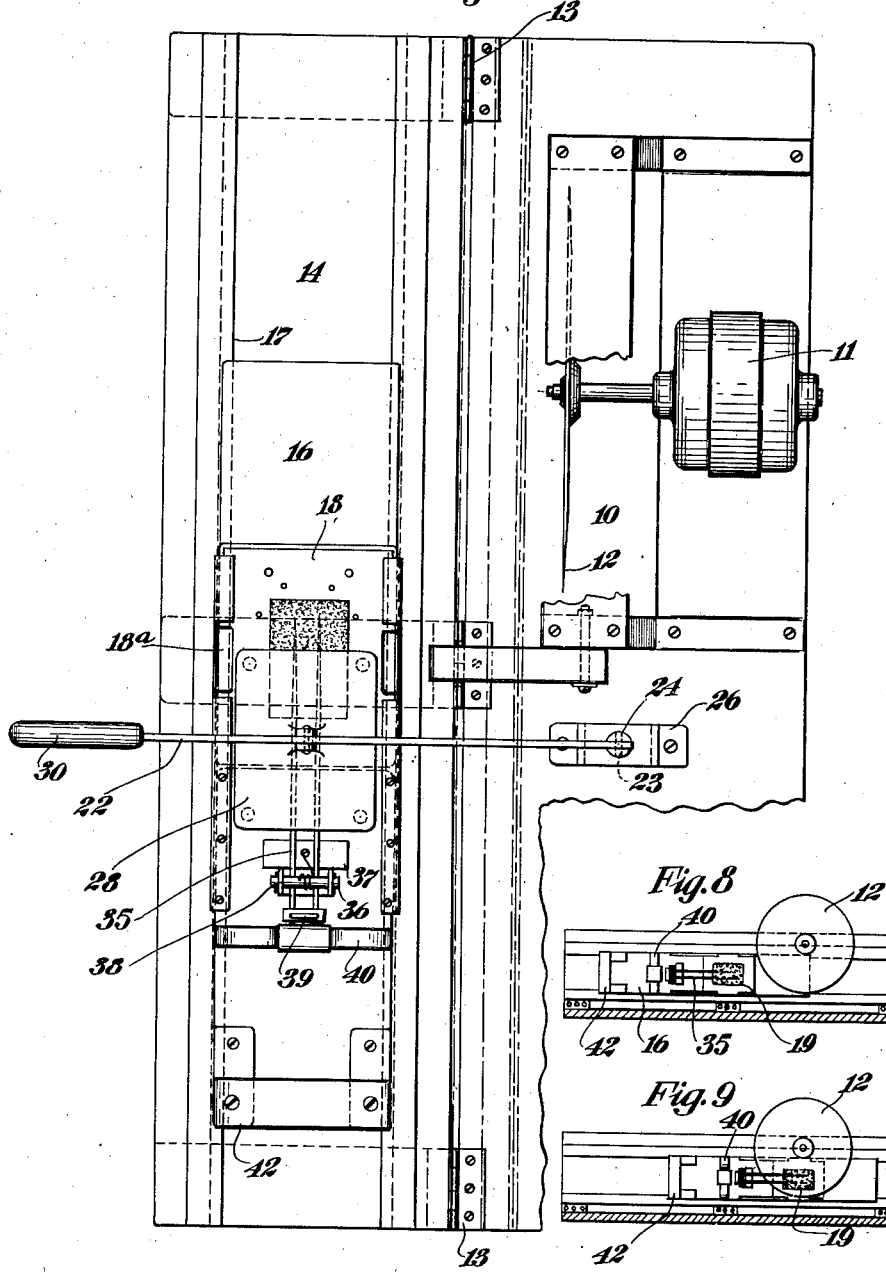
INVENTOR
Waldemar Vernet,
BY
ATTORNEYS

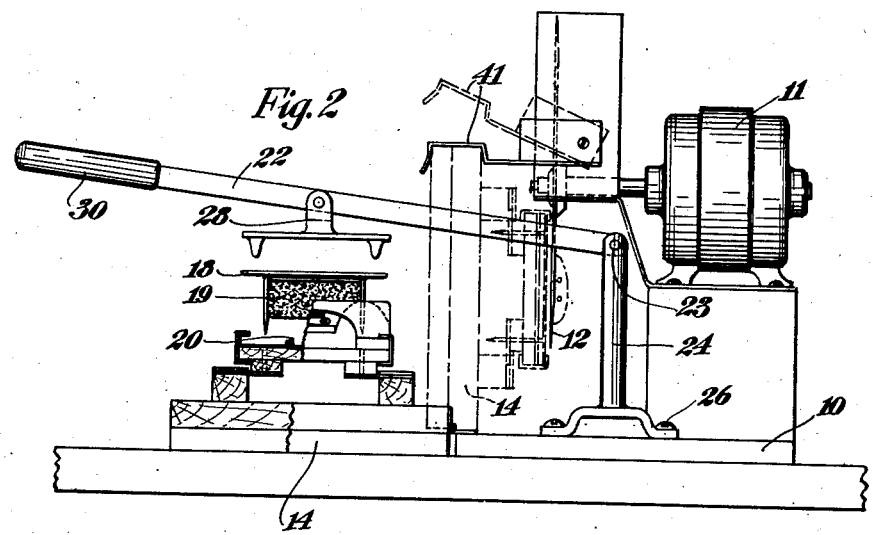
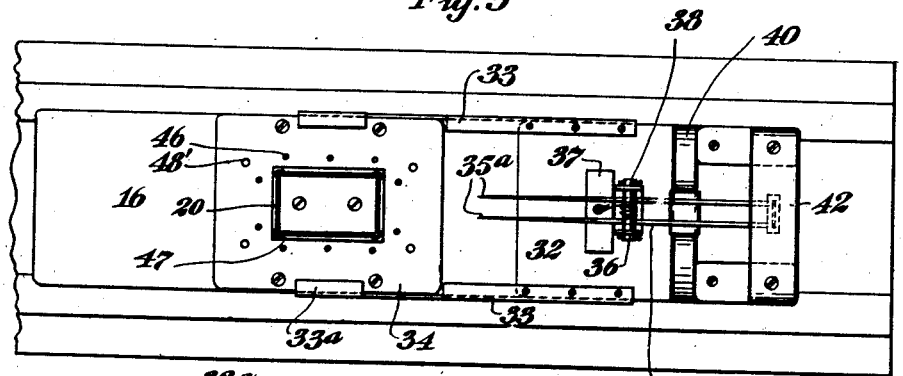
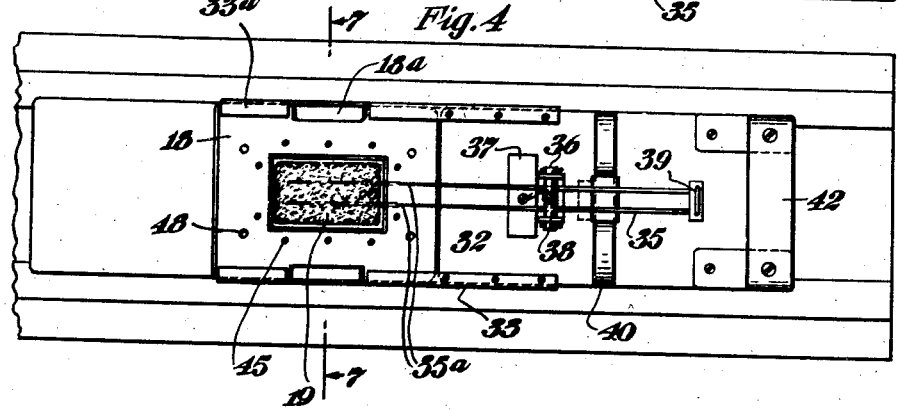

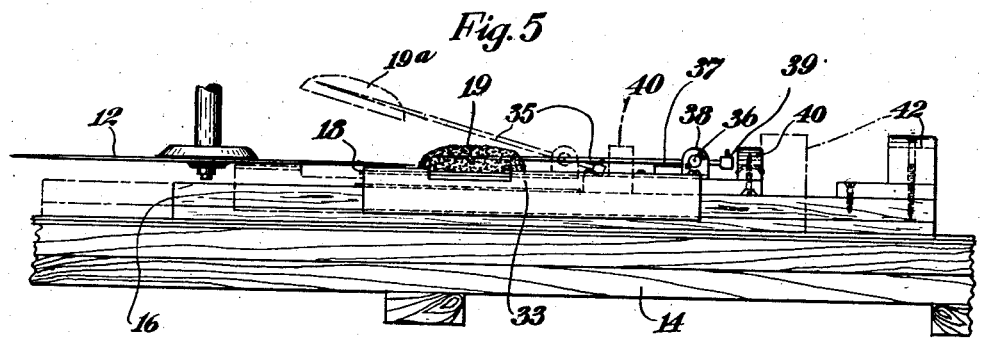
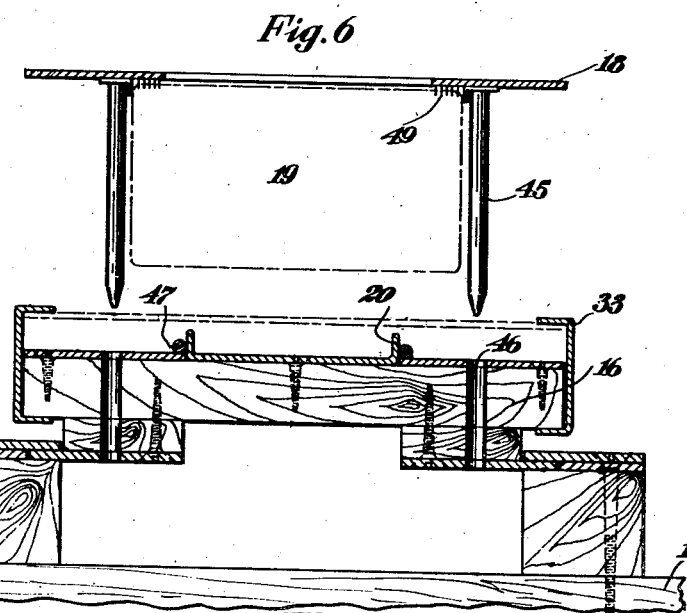
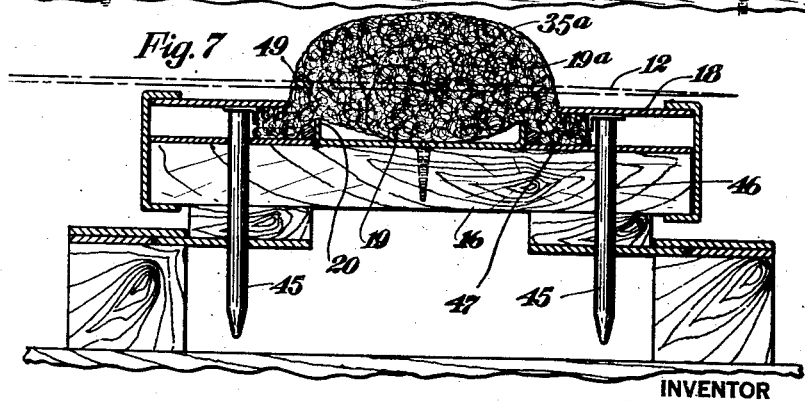

July 26, 1932. W. VERNET 1,868,932
METHOD AND APPARATUS FOR FORMING RECEPTACLES FROM SPONGE RUBBER
Filed Jan. 31, 1928 4 Sheets-Sheet 4
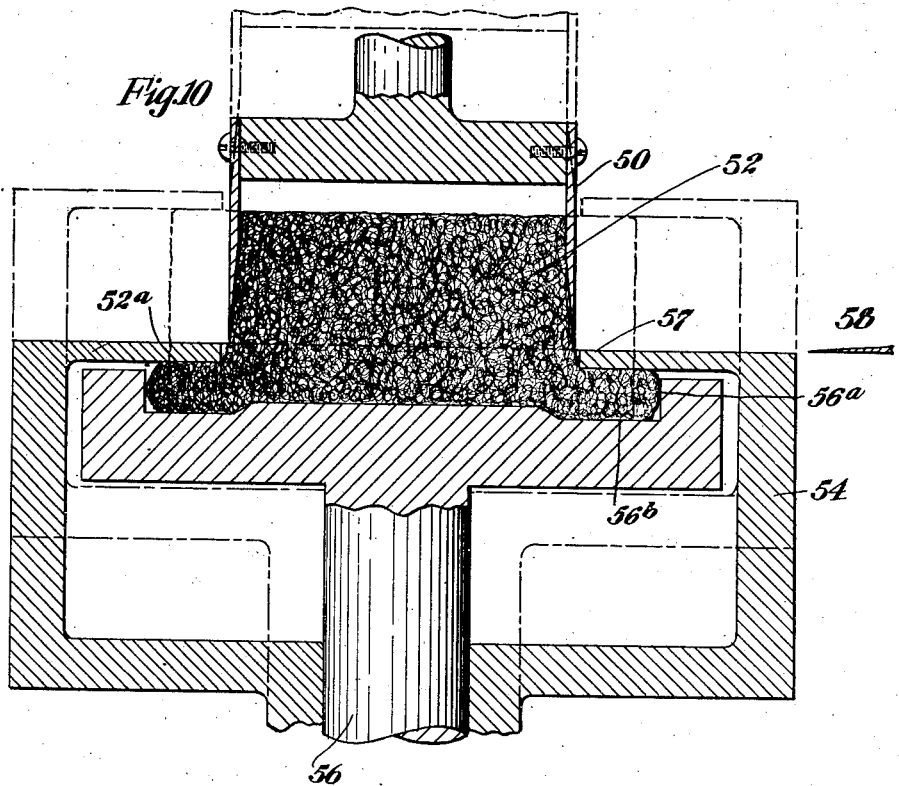
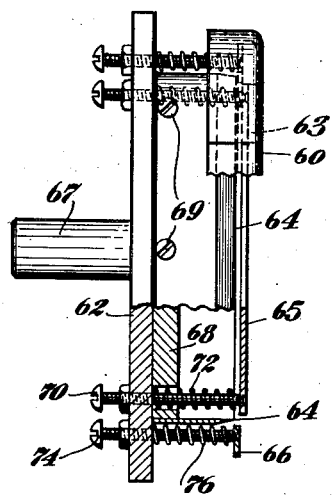
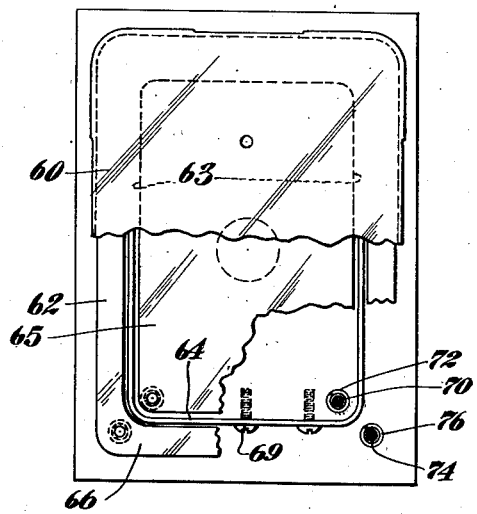
INVENTOR
Waldemar Vernet,
BY
ATTORNEYS Patented July 26, 1932

1,868,932

UNITED STATES PATENT OFFICE

WALDEMAR VERNET, OF NEW YORK, N. Y., ASSIGNOR TO RUBBERSAN PRODUCTS INC., OF NEW YORK, N. Y., A CORPORATION OF NEW YORK

METHOD AND APPARATUS FOR FORMING RECEPTACLES FROM SPONGE RUBBER

Application filed January 31, 1928. Serial No. 250,827.

This invention relates to improvements in a method and machine for cutting or otherwise forming depressed shapes in sponge rubber or similar materials and in particular relates to forming articles of manufacture such as soap containers, described in my copending application, Serial No. 236,052, filed November 28, 1927.

The cutting of artificial rubber sponges or other materials of such a nature has proved exceedingly difficult because of the elasticity, porosity and toughness of the material. For example, it is practically impossible to cut an artificial rubber sponge with a knife and there has been no sure, rapid, effective means to form a regular depression or depressed form in such a material.

It is, therefore, the principal object of this invention to provide a method and machine which is particularly effective and economical in cutting regular forms of sponge rubber or other similar material to form depressions or other shapes therein.

It is another object of the invention to provide a process which will permit the formation of regular deep depressions in a block of artificial rubber sponge of the nature described in said copending application.

It is still another object of this invention to provide a machine for cutting sponge rubber from the center of a block and in various shapes as may be desired.

It is still another object of this invention to provide a machine which will compress certain portions of an artificial rubber sponge or similar material permitting the uncompressed part remaining to be severed for the purpose of leaving a depressed center in the block after the compression is relieved.

It is a still further object of this invention to provide a satisfactory means for quickly, regularly and economically cutting and removing the center portions of sponge rubber blocks to provide soap dishes and other receptacles therefrom.

It is a still further object of this invention to provide a process or method for cutting or otherwise removing a certain regular portion from the inside of a block of artificial sponge in which the block is to finally become a depressed center soap receptacle.

Further objects and advantages of this invention will appear from the following description of preferred forms of embodiment of the device in connection with the attached drawings illustrating said forms of embodiment and in which:

Figure 1 is a plan view of the improved cutting device with the operating slide frame in the open or inoperative position;

Figure 2 is an end elevation of the device shown in Figure 1 with parts broken away;

Figure 3 is a plan view of the operating slide frame in detail showing the hollow sponge retainer frame unlocked;

Figure 4 is a similar plan view to Figure 3, but showing the sponge retainer frame locked, and in dotted lines, the tension needles in contact with the sponge;

Figure 5 is a plan view of a portion of the device showing the operating slide frame in closed or operative position and with the cut sponge in dotted lines;

Figure 6 is a vertical section of the sponge retainer frame open and unlocked with the sponge in outline;

Figure 7 is a vertical section on the line 7—7 of Figure 4 showing the sponge retainer frame in compressed and locked position;

Figure 8 is a detail side view showing the relative location of the cutter and sponge;

Figure 9 is a side view similar to Figure 8 showing the position of the sponge during cutting;

Figure 10 is a vertical section of a die and holder for stamping out the depressions with the die shown in dotted lines in raised position;

Figure 11 is a side elevation of a still further modified form of cutting device with parts in section; and, Figure 12 is a bottom plan view of the cutter of Figure 11, parts being in section.

The cutting machine as shown in Figures 1 to 9 is composed of two principal parts, one, the motor driven cutter 10 including the motor 11 and the knife 12, and the operating slide frame 14. The motor 11 and knife 12 are of the usual form, the proportions of power, speed and size of knife blade being determined by judgment, and being limited by the requirements of the cutting process. As shown, the knife blade is vertical but it is just as possible to make it horizontal or in any other desired manner. The motor driven cutter will thus be seen to be placed at the convenience of the other parts and it will only have the necessary characteristic of adequately cutting the articles presented.

The other important part of the device is the operating slide frame 14 which, in this device, is hinged by the hinges 13 or is otherwise attached to the frame of the motor driven cutter 12 for a purpose to be hereinafter shown. This slide frame is provided with the operating slide 16 which is adapted for limited movement in the grooves 17 on the frame 14.

The sponge or other material to be cut must be compressed in order to obtain clear, sharp forms and in fact to permit any regular cutting at all. If the porous spongelike material is compressed into a much smaller space it will be found that it may be cut very readily. There is one serious difficulty, however, and that relates to the proper manner of compressing the sponge. In other words, to cut out a regular center as shown in the soap container in the copending application, it is necessary to compress certain portions of the sponge only and it must be evenly compressed in order that when the pressure is released, the correct portion has been regularly cut allowing the rest to assume the natural shape.

As shown in Figures 2, 3 and 4 therefore, a hollow rectangular frame 18 surrounds the sponge 19, and it is then inverted on the plate 20 suitably provided with guiding means to prevent movement of the frame 18. A lever 22, suitably pivoted at 23 to an upstanding arm 24 which is anchored to the motor frame at 26, is provided with a pivoted force applying plate 28 and a handle 30. By applying a downward force to the handle 30, the sponge being positioned in the hollow rectangular frame 18, it will be possible to compress the sponge to any amount desired.

The frame 18 is locked in compressed position by the locking slide 32 having the overturned flanges 33 in contact with the edges 34 of the frame 18. A cut away portion 18a in the frame 18, equal to the size of the flange 33a, permits the frame 18 to be inserted in the slide 32 and requires the minimum of movement to completely lock the frame 18 holding the sponge 19 in its compressed position. The slide 32 is shown in contact with the frame 18 in Figure 4.

The slide 32 is provided with a pair of elongated needle like pins 35 whose forward ends 35a are adapted to be projected into contact with the portion of the sponge 19 which extends through the opening in the frame 18 after it has been compressed. These needles 35 extend through suitable holes in a pin 36 carried by a support 37 which upstands from the slide 32. A spring 38 tends to rotate the pin 36 to lift up the needle ends 35a when there is no obstruction. A handle 39 is provided to project and remove the needles into and from the sponge.

As shown in Figure 4, when the needle handle 39 is moved past the slide handle 40, the needles are then in contact with the uncompressed portion of the compressed sponge and when it has been cut, the needles will remove it from the path of the cutter blade 12.

The sponge 19 now having been placed in the frame 18, the force applying plate 28 positioned, the lever 22 depressed, the locking slide 32 moved into locking position, the lever 22 then being removed, and the needles 35 being pushed by their handle 39 into contact with the outwardly projecting portion of the compressed sponge, the operating slide 14 is in readiness to be operated.

The operating slide frame 14 is then folded up about the hinges 13 into a vertical position as shown in Figure 2 in dotted lines, and is latched into position by the latch 41. In this position, the sponge is in a line with the cutter altho to the rear thereof, as more particularly shown in Figure 8. The operator by moving the operating slide 16 by means of the operating slide handle 42, will force the sponge past the rapidly revolving cutter blade 12 as shown in Figure 9 and the outwardly projecting part 19a of the sponge 19 will be cut off and forced outwardly by the needles 35. (See Figure 5.) After the sponge has been cut, it may be passed through the cutter a second time for a deeper and more regular cut. When sufficient material has been removed, the reverse sequence of operations takes place and the soap dish or other hollow container is formed. It will be understood that the sides of the container return to their normal position and a deep depression or pocket in the center has resulted.

In Figures 6 and 7 certain details of construction are shown with the hollow rectangular frame in both the compressed and non-compressed positions. For example, Figure 6 shows the sponge locating pins 45 together with the cooperating holes 46 in the surface of the operating slide 16. A wire 47 is provided around the plate 20 to additionally force more of the sponge through the opening in the hollow frame 18. It is clear that the more material there is forced through the opening, the deeper the sponge will be cut. The effect of the upstanding angular formation of the plate 20 as well as the extra wire 47 is shown in Figure 7 where the sponge is in the compressed position. In this figure, the outline of the cutter blade 12 is also shown with its relation to the projections of the needles 35a and the top of the frame 18. It is to be understood that the top part 19a of the sponge will be severed and removed from the remainder of the sponge 19, as shown in Figure 5.

Additional guide pins 48 may be used as shown in Figure 4 and these pins will operate in the same manner as the locating pins 45 which locate the sponge altho they may be longer and heavier. A further desirable feature is the very short projections 49 which surround the opening in the frame 18 on the underside. They come in contact with the edge of the sponge and on compression, prevent the edges from being forced through the central opening in the plate 18.

It will be understood from the device disclosed in Figures 1 to 9 inclusive that this machine is merely one which has successfully and satisfactorily cut the depressions in the rubber sponge of the nature and size of a cake of soap which is the desired object of this machine. The machine, however, is merely one which includes and carries out a process which must underlie any machine for this purpose.

In its simplest form this process consists of four steps. It is understood that the object is to form a depressed portion in a rubber sponge by removing a portion from the inside, that the sponge is of such porosity and resilience that it cannot normally be cut except with great difficulty with a knife or other shearing means and that the material is of the general nature of the common artificial rubber sponge.

The process then includes: first, compressing that portion of the material which is to form the upstanding and uncut portion of the object in its final form; second, allowing all parts of the sponge desired to be removed to be projected substantially uncompressed above the surface of the compressed part such as is shown in Figure 7 or Figure 10 in which the portion 19a or 52 is projected above the remainder of the sponge 19 or 52a in a substantially uncompressed condition; third, to cut the upstanding, uncompressed portion by some form of cutter preferably of the rapidly revolving type; and fourth, to relieve the pressure on the sponge permitting the compressed portion to return to its natural position which will be considerably above the remainder of the sponge.

The same process will be followed no matter what the shape of the sponge. It might be necessary to cut a portion of the sponge in the first operation in order that the compressed part does not so increase the tension on the uncompressed part that the part to be cut is also under compression. In other words, if it were desired to cut an annulus from the center of a block of sponge rubber it would be necessary to make two or more compressions and cuts in order that sufficient material could be removed.

Another important feature of the process is that the sponge when compressed does not compress regularly but compresses in waves. It will readily be seen if a regular block of sponge rubber be compressed from the top that on compression the sides form a wavy or irregular shape and it is obvious that if cut with a sharp knife in a single plane that upon expansion to the usual shape the sides will be wavy. It is, therefore, necessary that the sponge be so compressed that the sides will be in a single plane. It has been found that the small sharp projections 49 on the under side of the frame 18 materially aid this condition and keep the sponge in such shape that it may be cut by a revolving knife blade and still show a regular cut after the pressure has been released.

A modified form of the device is shown in Figure 10 in which a circular knife 50 which may be rapidly revolved by any desired means, is forced into contact with an uncompressed block of rubber sponge 52. Due to the rapid rotation of the knife 50 it will be possible to cut a circular groove in the rubber block 52, such groove being cut to any desired depth which will be the actual depth desired. Subsequently, the rubber block is compressed in a suitable die 54 mounted on a plunger 56 the latter having a supporting head 56a beneath the inwardly extending flanged portion 57 of the die 54. When the die 54 is moved downwardly (as viewed in Fig. 10) the flanged portion 57 of the die 54 compresses the sides, forcing them down and into a suitable recess 56b in the plunger head 56a and permitting the center of the sponge 52 to remain in an uncompressed condition and above the compressed sides 52a. A suitable knife 58 which is preferably of the revolving type will then sever the upstanding center of the sponge 52 and upon relieving the pressure on the sides 52a it will be found that a depression is formed in the sponge which is regular in shape and that the depth of the bottom is substantially equivalent to the depth of the uncompressed portion of the sponge below the cutting blade before cutting.

It is to be noted that if an oval-shaped sponge is forced into a circular container which would ordinarily hold a circular sponge, the shape of the sponge will take the shape of the container and will therefore become circular in form. Upon being cut with a rotating knife as described and shown in Figure 10 a circular cut being made and then the upstanding portion of the sponge being removed, as the sponge has been compressed it will be found that an oval shape has been cut in the sponge which is in all respects regular with respect to the exterior of the sponge.

In Figure 10, it is therefore possible to cut either oval or round holes in the sponge, whereas, in Figures 1 to 9 it is possible to cut rectangular, round or oval sponges within a certain degree depending upon the shape of the compression frame 20 and the hole in the frame 18. There are certain limitations and the shapes must be generally regular and no great variety can be formed. In Figure 10, however, the shapes are more limited to circular and variations of the circular depending upon the original shape of the sponge and the manner in which compressed.

The knife 50 may be of the non-rotating or reciprocating type if desired, and under such circumstances, the sponge 52 would be retained in the open part of the die 54 until the cutter 50 had made the necessary grooves in the sponge. As the cutter is then removed, the plunger 56 in the die 54 would then move up, forcing the sponge center through the opening in the die 54 while the sides 52a are retained under the overhanging sides of the die 54. The removal of the uncompressed upstanding center will be made in the same manner as before and the pressure will then be relieved to permit the complete sponge receptacle to be completed.

It is to be noted that all of these variations of the machine use the same process of cutting and removing an uncompressed portion of an otherwise compressed sponge and subsequently relieving the pressure so that the compressed portion in regaining its natural shape will form the sides for the remainder of the sponge and substantially form a sponge with a depressed center.

In Figures 11 and 12, a still further modified form of the device is shown which includes the sponge receiving plate 60 and the die 62. The sponge receiving plate 60 will take the exterior form of the sponge to be cut and will be slightly higher than the compressed height of the sponge. This plate will be provided with a central upstanding plate 63 which will be substantially the size and shape of the internal sides of the depression to be cut out and its use will be hereinafter explained. In cooperation with this sponge receiving plate is the die 62 which is to be used in connection with a suitable punch press of any desired form (not shown) and is comprised of the main plate which supports the integral knife 64 and the internal and external compression plates 65 and 66. The internal compression plate 65 is of the shape and size of the part of the sponge to be cut and the external plate 66 is the size and shape of that part of the sponge which will eventually form the sides or the uncut part.

An upstanding lug 67 is provided for the purpose of attachment to the punch press not shown to which it will be securely attached. The knife blade 64 as shown herein is rectangular in shape and is of a depth slightly less than the distance of the external plate 66 from the main plate 62. The knife may be attached to the main plate in any manner although it is shown as bolted to a supplemental plate 68 by the bolts 69.

The internal plate 65 is spaced from the main plate 62 by the four adjusting bolts 70 which are surrounded by tensile springs 72. In a similar manner, the external plate 66 is spaced under tension by the bolts 74 and springs 76. It is obvious that by adjusting the bolts 70 or 74 the effect of the springs 72 and 76 may be altered changing the tension on these plates. The tension on the plates determines the amount the sponge will be compressed before the cutter 64 comes into contact with the sponge. The relative distance between the cutter knife 64 and these plates 65 and 66 determines the amount of the cut, but the tension on the plates determines the amount of compression of the sponge and in the cooperation of the two, the depth of cut may be accurately adjusted and determined.

It will be understood that in operation the main plate 62 of the die being fastened by the upstanding lug 67 to a suitable press, will be placed over an uncompressed sponge. On the downward movement of the press, the sponge will be compressed because of the tension of the springs between the main plate and the outside plate and because of the fact that the sponge is in contact with the frame, the sponge will be compressed regularly and evenly along its sides.

It will be further noted in an inspection of Figure 12 that the internal plate is of slightly greater distance from the main plate than the external plate and that the center of the sponge will be depressed first. This is for the purpose before mentioned that it is necessary to compress the sponge from the center first in order that the sponge will entirely fill the frame and that after compression the sponge will present a regular shape which upon being cut will return to a regular shape. In other words, the die as shown will compress the center outward against the frame and upon subsequent compression the external plate will force the excess also against the frame presenting a uniform shape to be cut. No other manner of compressing the sponge in a regular manner has been found.

The internal and external plates being forced to a point at which the tension of the sponge is equal to the tension of the springs, further movement of the main plate will be not only relative to the sponge but will also be relative to the internal and external plates. Such movement will force the knife into contact with the sponge which is now under a high compression and a very slight movement of the knife will therefore cut the sponge. Upon relief of the pressure from the press and from the sponge the sponge will regain its original shape although there will be a cut surrounding the wall of the sponge and to the desired depth. The sponge is then placed in a suitable machine such as shown in Figures 1 to 9 or in 10 for the purpose of forcing down the sides permitting the center to be uncompressed and therefore upstanding at which time the upstanding center may be removed by a revolving cutter or other device.

It will be understood from an inspection of the device shown in Figures 11 and 12 that when the sponge which is ordinarily of a thickness of an inch or inch and a half or more is compressed to approximately three-eighths of an inch or less a very small movement of the knife blade will cause a very deep cut. In other words, to obtain a cut of three-quarters of an inch in an inch and a half sponge which has been compressed to three-eighths of an inch, it will be necessary to move the knife three-sixteenths of an inch. The depth of cut is to the depth desired as the height of the sponge compressed is to the height of the sponge uncompressed. Very small errors obviously make material differences in the final size of the sponge.

It will be understood that in relation to Figures 11 and 12 that the knife may be of any shape desired, regular or irregular in form and that it may be made in any desired variations thereof. There is no limitation to the variety of forms that may be cut by such a knife and it is to be understood that such a knife need merely be arranged to cut to the proper depth and that the subsequent machine which depresses the sides be of substantially the same shape as the cut in the sponge in order that the sides of the sponge may be drawn down uniformly.

A further important feature shown in Figure 12 resides in the formation of the internal upstanding plate 63 of the frame which not only aids to force up the center of the sponge to more advantageously form the sponge to be cut but is of also such nature that the knife 64 in the die comes substantially close to the plate to aid in cutting the sponge. It permits a shearing action and will therefore cut more sharply and more definitely.

From the foregoing disclosure it will be apparent that I have described a process for cutting deep depressions regular in shape in blocks of artificial sponge rubber or materials of that general nature of porosity, toughness and resilience. With such materials, it is neecssary to compress the parts that are not to be cut, permitting the uncompressed portions, extending above the compressed portions to be removed by some form of knife cutter. In such process, it is necessary to regulate the amount of compression, and the depth and shape of the cut is dependent upon such compression. It is also necessary to compress the material evenly, or as described herein, by compressing the center first and then the upper edges which will force the material against a side wall to maintain the regularity.

The specific machines described herein are not intended as limitations on the process, but as illustrations of means for practicing the same. It is to be understood that automatic movements may replace many of the hand movements described and that many other modifications and improvements could be made on these devices, the process, however, substantially remaining the same.

I claim:

1. A method of removing from a block of highly compressible and resilient spongious material an inner portion of substantially the same area of the body which comprises compressing the edges of said material around the central portion of the same and while so compressed severing the protruding uncompressed central portion of said material from the remainder of said block.

2. A method of forming uniform depressions in a block of highly compressible porous but resilient spongious material comprising compressing the portions of said material to be retained away from portions of said material to be removed and while so compressed severing the uncompressed protruding material in the remainder of said block.

3. The process of cutting sharp cornered recesses in porous resilient spongious material which includes compressing and contracting portions only of the sponge about a definite pattern desired to be raised, additionally compressing and contracting portions adjacent the corners to be sharp cut, removing the remaining noncompressed material and relieving the pressure to permit the compressed part to return to the normal raised position.

4. A method of forming a depressed portion in a block of porous sponge rubber which comprises cutting the block along the side walls of the portion to be removed to sever the part to be removed from the part to be retained, compressing and contracting the cut part to be retained, cutting the uncompressed part to be removed from the uncompressed part to be retained and removing the compression on the compressed part to form extended side walls above the uncompressed cut portion.

5. The method of forming an oval depression in an oval block of porous artificial sponge rubber which comprises compressing the block of rubber into a cylindrical shape making a cylindrical cut into one face of said compressed cylindrical block depressing the sides of said block around said cut, severing the cut-out center from said block and relieving the pressure on said sponge.

6. In a machine for cutting square angled depressions in porous resilient sponge material, a container to receive the sponge material, a press to compress and contract parts of the sponge including means to additionally compress the corner sections, a movable cutter to cut the remaining non-compressed parts, and means to relieve the pressure after cutting to permit the compressed parts to return to their normal position at sharp angles with the non-compressed portion.

7. A machine for cutting uniform sharp angled sections from the center of a block of porous artificial sponge rubber which comprises a container for said block, a cutting die, means to force said cutting die into a face of said block, means to depress the uncut sides adjacent said cut and means to sever said central portion from the remainder of said block.

8. A machine for cutting a center from a block of artificial sponge rubber which comprises means to form a cylindrical cut in said block, a receptacle for holding said block, said receptacle having an opening corresponding to the part of the sponge to be removed, a piston-like bottom in said receptacle movable to compress the sponge about said opening and project a part of said block through said opening, cutter means to remove said projecting part from said block, said piston-like bottom being retractible to relieve the compression on said compressed part.

9. A machine for cutting an oval center from a block of porous artificial sponge rubber comprising a cylindrical container, a piston-like bottom in said container, said container having an opening therein, said piston-like bottom being movable to compress a part of said sponge against a part of said container and to project the center of said sponge through said opening, means to sever the exposed center, said piston-like bottom being retractible to relieve the compression on the compressed portion of said block.

In testimony whereof I have affixed my signature to this specification.

WALDEMAR VERNET.